No. 687,045. Patented Nov. 19, 1901.
D. W. MALONEY & J. H. WELSH.
HORSESHOE PAD.
(Application filed May 8, 1901.)
(No Model.)
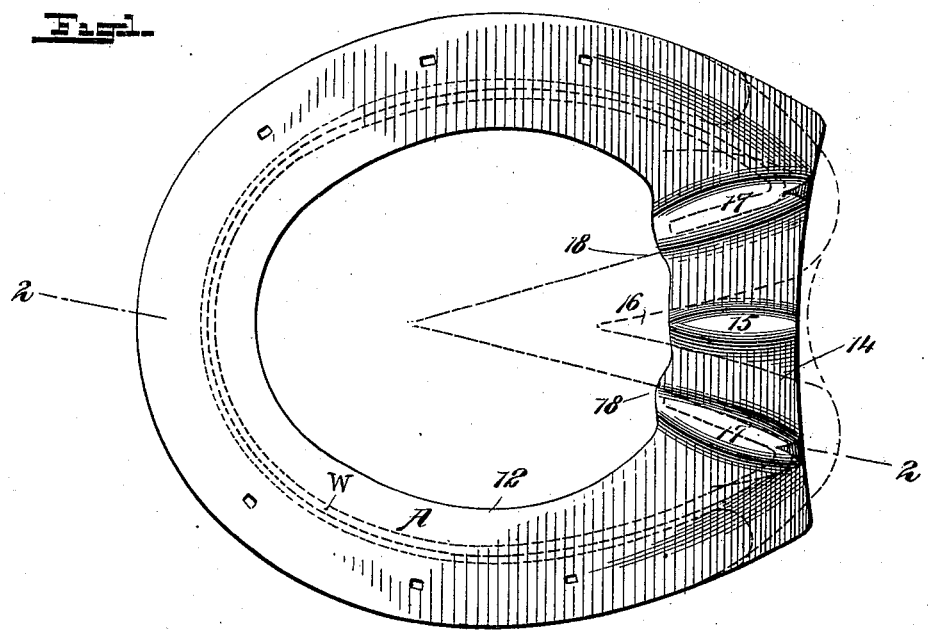
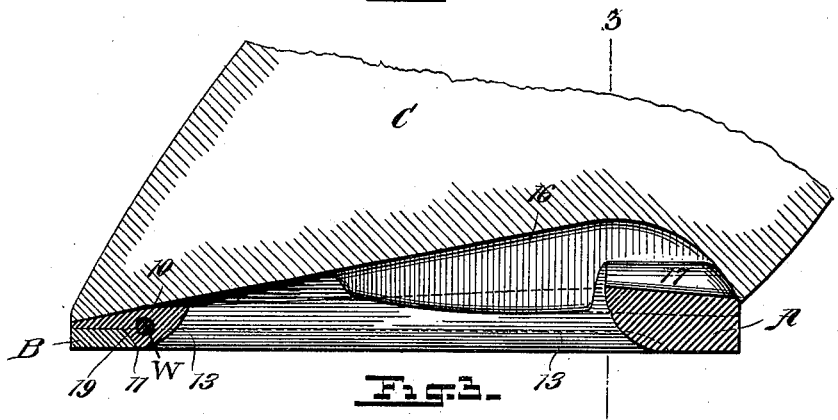
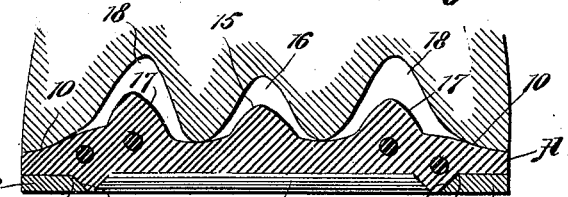
WITNESSES:
INVENTORS
Daniel W. Maloney
James H. Welsh
BY
ATTORNEYS

UNITED STATES PATENT OFFICE.

DANIEL W. MALONEY AND JAMES H. WELSH, OF WHITEPLAINS, NEW YORK.

HORSESHOE-PAD.

SPECIFICATION forming part of Letters Patent No. 687,045, dated November 19, 1901.

Application filed May 8, 1901. Serial No. 59,250. (No model.)

*To all whom it may concern:*

Be it known that we, DANIEL W. MALONEY and JAMES H. WELSH, citizens of the United States, and residents of Whiteplains, in the county of Westchester and State of New York, have invented a new and Improved Horseshoe-Pad, of which the following is a full, clear, and exact description.

The purpose of the invention is to provide a rubber horseshoe-pad and shoe so combined that the shoe becomes practically a portion of the pad and to so construct the pad that its inner face will correctly conform to the concavity of the bottom of the hoof, adjacent to the wall thereof, affording an equal bearing to the foot and preventing the pad from shifting and dirt collecting under the pad and shoe.

A further purpose of the invention is to locate transverse ribs on the upper face of the pad at the heel portion, which ribs are adapted to enter the frog of the hoof and the spaces between the side walls of the hoof and the frog, said ribs serving to brace the pad and keep it from shifting. The ribs further serve to impart to the hoof its natural yielding action at the heel, as when the pad expands or contracts or the foot is raised or lowered the ribs impart similar movement to the hoof, preventing contraction.

Another purpose of the invention is to so construct the pad that an opening is made in the center thereof, which admits air to the hoof and prevents concussion by reason of the air being compressed in said opening and against the under face of the hoof when the hoof strikes the ground.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved pad and attached shoe. Fig. 2 is a section taken practically on the line 2 2 of Fig. 1, the section being also taken through a portion of the hoof to which the pad and shoe are applied; and Fig. 3 is a section taken practically on the line 3 3 of Fig. 2.

A represents the improved pad. This pad is constructed of rubber, which may be provided with suitable layers of canvas or of light leather for the purpose of stiffening the pad to a certain extent. The upper face 10 of the said pad is convexed and more or less inclined, so that it will conform to the under face of the hoof C, at the wall of the sole portion thereof. A recess 11 is made in the under face of the pad A at its margin, and the recess extends around the sides and front of the pad, terminating at a point near the rear of the heel portion of the pad, and the inner or longitudinal wall of this recess is inclined downward in direction of the center of the pad, as is shown particularly in Figs. 2 and 3. An opening 12 of suitable size is made at the central portion of the pad, and at the under face of the pad the material around the opening 12 is curved in an upward direction from the lower part of the inclined wall of the recess 11 to the upper surface of the pad, as shown at 13. Thus it will be observed that the pad consists of continuous side, front, and heel sections. On the upper face of the heel-section 14 of the pad a series of ribs 15 and 17 is transversely formed. These ribs are practically of oval shape in general contour, but preferably they incline at the sides in opposite directions from their longitudinal centers. The rib 15 is the central rib, and the ribs 17 are side ribs, the ribs 17 being at more or less of an angle to the central rib 15. When the pad A is placed upon the hoof, the central rib enters the frog 16, while the side members 17 enter the spaces 18 between the sides of the frog and the walls of the hoof, as shown in Figs. 1 and 3.

B represents the horseshoe, which is fitted in the recess 11 at the under face of the pad A, and the inner edge 19 of the shoe is beveled correspondingly to the bevel at the inner wall of the recess 11, the two said beveled surfaces being adapted to be brought into close engagement. The shoe after being placed upon the pad and the pad fitted to the hoof is nailed to place in the usual way, the nails passing through the pad.

A horseshoe-pad when constructed as described and properly fitted to the hoof affords the hoof as much freedom as if the animal were unshod and traveling on soft ground, thus preventing slipping, contraction of the hoof, corns, quarter cracks, and strained tendons. Contraction is prevented, as stated, by the ribs 15 and 17 entering the heel-grooves in the hoof, causing the pad to carry the heel-section of the hoof with it when the pad expands under pressure. The shoe being beveled at its inner edge and fitting to a corresponding bevel on the rubber pad holds the pad firmly to the hoof. The pad being cut out at the center on a bevel prevents balling and likewise picking up of dirt and stones and admits air to the hoof. The opening in the center of the pad likewise prevents concussion when the hoof strikes the ground by reason of the air being compressed in the chamber formed by the opening, and the pad fitting the hoof perfectly when the pad receives the weight of the horse an air-tight connection is established between the pad and the hoof, thus tending to prevent the horse from slipping or sinking in mud or moist or soft ground.

It will be observed that the shoe is made in such beveled shape that holds the rubber pad firmly to the foot as the beveled portion of the shoe presses inward and upward against the rubber pad. Thus the rubber pad takes the jar of the shoe, and as the rubber pad conforms to the shape of the hoof the bearing of the pad and shoe is equally distributed upon the foot. It will also be observed that a full or a three-quarter shoe may be used and that as the inner side edges of the pad and its heel portion come in contact with the ground the possibility of slipping is reduced to a minimum. The shoe can be made light and narrow, because the inside edges of the pad take part of the wear.

When desirable, the pad may be stiffened and strengthened by placing a properly-shaped wire W in the pad in any approved manner, as shown in dotted lines in Fig. 1.

Having thus described our invention, we claim as new and desire to secure by Letters Patent—

1. A horseshoe-pad having a central opening the wall of which is inclined upwardly and inwardly from the under face of the pad to the upper surface thereof, the upper face of the pad being convexed and fitted for close contact with the under face of a hoof, as described.

2. A horseshoe-pad having a central opening and consisting of continuous side, front and heel sections the wall of the central opening being curved upwardly and inwardly from the under face of the pad to the upper surface thereof, and a series of ribs at the upper face of the heel portion of the pad.

3. A horseshoe-pad having a marginal recess in its under face the inner wall of which is inclined inwardly and downwardly, and a central opening the wall of which is curved in an upward direction from the lower part of the inclined wall of the recess to the upper surface of the pad.

4. A horseshoe-pad constructed of rubber and shaped on its upper face to conform to the concavity of the bottom of the hoof adjacent to the wall thereof, the said pad having a marginal recess in its under face the inner wall of which is inclined inwardly and downwardly, and a central opening having its wall curved in an upward direction from the lower part of the inclined wall of the marginal recess to the upper surface of the pad, and a series of transverse ribs located on the upper face of the heel portion of the pad, for the purpose set forth.

5. A horseshoe-pad constructed of rubber and provided with a central opening the wall of which is inclined from the under face of the pad upward, and a series of transverse ribs located on the upper face of the heel portion of the pad, the said ribs being arranged one to enter the frog of a hoof and the others the spaces between the frog and the wall of the hoof.

6. The combination with a horseshoe-pad having a central opening, the wall of which is inclined from the under face of the pad upward, and a marginal recess in the under face of the pad, the inner wall of which is inclined inwardly and downwardly, of a shoe fitted to the said recess and provided with a beveled inner edge conforming to inclination of the inclined wall of the pad.

7. The combination with a rubber horseshoe-pad having a central opening, the wall of which is curved upwardly and inwardly from the under face of the pad to the upper surface thereof, the inner or upper face of the pad conforming in shape to the bottom of the hoof, and a marginal recess in the under face of the pad, the inner wall of which is inclined inwardly and downwardly, of a shoe fitted to the said recess and provided with a beveled inner edge conforming to the inclination of the inclined wall of said recess.

8. A rubber horseshoe-pad having its upper face convexed and fitted for close contact with the under face of a hoof, the said pad being provided with ribs at the upper face of the heel portion adapted to enter the frog of the hoof and the spaces between the walls of the hoof and the frog, the pad having a marginal recess in its under face, the inner wall of which is inclined inwardly and downwardly.

In testimony whereof we have signed our names to this specification in the presence of two subscribing witnesses.

DANIEL W. MALONEY.
JAMES H. WELSH.

Witnesses:
WILLIAM CALLANAN,
PATRICK HICKEY.